US009701793B2

(12) United States Patent
Xiao et al.

(10) Patent No.: US 9,701,793 B2
(45) Date of Patent: Jul. 11, 2017

(54) ALIGNMENT FILM, METHOD FOR PREPARING THE SAME AND LIQUID CRYSTAL DISPLAY DEVICE COMPRISING THE SAME

(71) Applicants: Ang Xiao, Beijing (CN); Shanshan Wang, Beijing (CN)

(72) Inventors: Ang Xiao, Beijing (CN); Shanshan Wang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 284 days.

(21) Appl. No.: 14/387,029

(22) PCT Filed: Nov. 12, 2013

(86) PCT No.: PCT/CN2013/086970
§ 371 (c)(1),
(2) Date: Sep. 22, 2014

(87) PCT Pub. No.: WO2014/190673
PCT Pub. Date: Dec. 4, 2014

(65) Prior Publication Data
US 2016/0152772 A1 Jun. 2, 2016

(30) Foreign Application Priority Data
May 31, 2013 (CN) .......................... 2013 1 0215295

(51) Int. Cl.
C09K 19/00 (2006.01)
C08G 73/10 (2006.01)
C09K 19/56 (2006.01)
G02F 1/1337 (2006.01)
C09D 179/08 (2006.01)

(52) U.S. Cl.
CPC ....... C08G 73/1067 (2013.01); C08G 73/105 (2013.01); C08G 73/1039 (2013.01); C08G 73/1064 (2013.01); C08G 73/1071 (2013.01); C09D 179/08 (2013.01); C09K 19/56 (2013.01); G02F 1/133723 (2013.01); Y10T 428/1005 (2015.01); Y10T 428/1023 (2015.01)

(58) Field of Classification Search
CPC ............ C08G 73/1067; C08G 73/1039; C08G 73/1064; C08G 73/1003; C08G 73/1007; C08G 73/105; G02F 1/1337; G02F 1/133711; G02F 1/133723; G02F 1/13378; Y10T 428/10; Y10T 428/1005; Y10T 428/1023
USPC .......... 428/1.1, 1.2, 1.26; 427/162; 349/123, 349/126; 528/353, 173, 176, 188, 350
See application file for complete search history.

(56) References Cited

U.S. PATENT DOCUMENTS 5,276,132 A * 1/1994 Nishikawa ......... C08G 73/1017
349/123

FOREIGN PATENT DOCUMENTS

| CN | 101251687 A | 8/2008 |
| CN | 101430458 A | 5/2009 |
| CN | 102504310 A | 6/2012 |
| CN | 103059298 A | 4/2013 |
| JP | 05-281551 A | 10/1993 |

OTHER PUBLICATIONS

International Preliminary Report on Patentability Appln. No. PCT/CN2013/086970; Dated Dec. 1, 2015.
First Chinese Office Action issued Jun. 26, 2015 Appln. No. 201310215295.X.
Chinese Notice of Allowance issued Jan. 21, 2016; Appn. No. 201310215295.X.
International Search Report Appln. No. PCT/CN2013/086970; Dated Jan. 22, 2014.
First Chinese Office Action dated Jun. 26, 2015; Appln. No. 201310215295.X.

* cited by examiner

Primary Examiner — Ruiyun Zhang
(74) Attorney, Agent, or Firm — Ladas & Parry LLP

(57) ABSTRACT

An alignment film, a method for preparing the same, a liquid crystal display device including the alignment film. The alignment film is an oriented polyimide film. The method for preparing the alignment film includes: adding a bridging diphenyl diamine to N-methylpyrrolidinone, followed by the addition of 1,4,5,8-naphthalenetetracarboxylic dianhydride to allow the reaction to occur, and filtering the reaction mixture to give a liquid polyamide acid; dissolving the liquid polyamide acid into N-methylpyrrolidinone to give a solution, which is coated onto the surface of a substrate and subjected to a heat treatment, to produce a polyimide film; and orienting the polyimide film via an orientation process to form an alignment film, wherein, polyimide has a structure represented by Formula-4:

Formula-4 wherein, R is a strong electron withdrawing group, each of $R_1$ and $R_2$ is independently methyl, ethyl, propyl, isopropyl, methoxy, ethoxy, propoxy, or isopropoxy, The polyimide film has good optical transmittance.

7 Claims, No Drawings

ALIGNMENT FILM, METHOD FOR PREPARING THE SAME AND LIQUID CRYSTAL DISPLAY DEVICE COMPRISING THE SAME

TECHNICAL FIELD

Embodiments of the invention relate to an alignment film, a method for preparing the same, a liquid crystal display device comprising said alignment film.

BACKGROUND

During the manufacture of Thin Film Transistor Liquid Crystal Display, an alignment film (i.e., a polyimide film after orientation) is typically used such that the crystal molecules are uniformly aligned on the surface of the film, to achieve an oriented arrangement of the liquid crystal molecules. Because the light will be partially absorbed by the polyimide film when it passes the film, a polyimide film having high transmittance plays a critical role in the manufacture of a liquid crystal display panel having low energy consume and high contrast.

A conventional polyimide film is shown below:

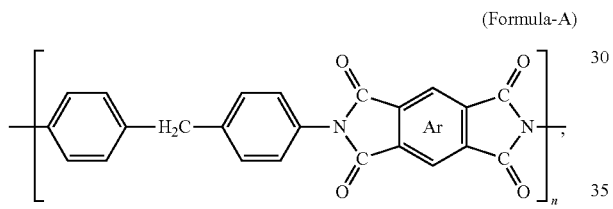

(Formula-A)

wherein, Ar may be phenyl, naphthyl, diphenyl ketone group, diphenylmethane group, diphenylether group, or diphenyl sulfonyl. Such conventional polyimide typically has a light transmittance of about 70-75%.

SUMMARY

An embodiment of the present invention provides an alignment film, which is formed by polyimide having a structure represented by Formula-4:

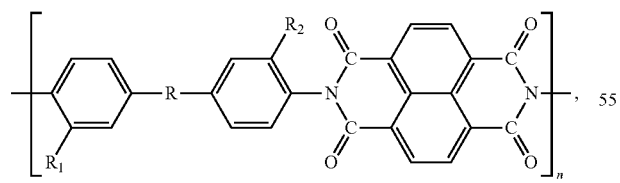

Formula-4

Wherein, R is a strong electron withdrawing group, each of $R_1$ and $R_2$ is independently methyl, ethyl, propyl, isopropyl, methoxy, ethoxy, propoxy, or isopropoxy.

For example, said R is S, O, $SO_2$, $CCl_2$, or $CF_2$.

Polyimide is produced by reacting 1,4,5,8-naphthalenetetracarboxylic dianhydride represented by Formula-1 with bridging diphenyl diamine represented by Formula-2,

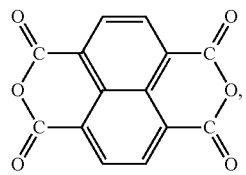

Formula-1

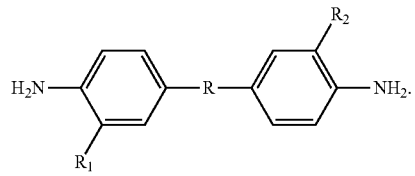

Formula-2

A method for preparing an alignment film comprises:

(1) adding a bridging diphenyl diamine represented by Formula-2 to N-methylpyrrolidinone, followed by the addition of 1,4,5,8-naphthalenetetracarboxylic dianhydride represented by Formula-1 to allow the reaction to occur, and then filtering the reaction mixture to give a liquid polyamide acid,

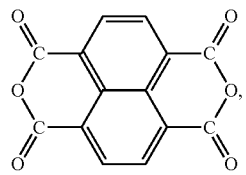

Formula-1

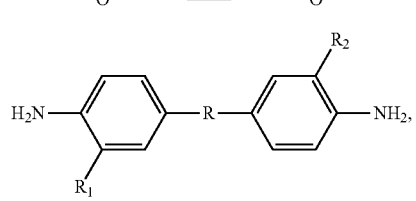

Formula-2

In Formula-2, R is a strong electron withdrawing group, each of $R_1$ and $R_2$ is independently methyl, ethyl, propyl, isopropyl, methoxy, ethoxy, propoxy, or isopropoxy;

(2) dissolving the liquid polyamide acid into N-methylpyrrolidinone to give a solution, which is coated onto the surface of a substrate and subjected to a heat treatment, to produce a polyimide film; and (3) orienting the polyimide film via an orientation process to form an alignment film, wherein, polyimide has a structure represented by Formula-4:

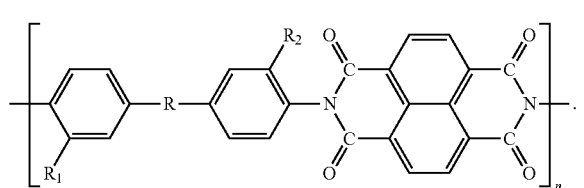

Formula-4

R is S, O, $SO_2$, $CCl_2$, or $CF_2$.

For example, step (1) can occur at room temperature.

For example, the heat treatment in step (2) includes: heating for 3-6 min at 90-100° C., and then heating for 40-80 min at 220-250° C.

For example, the orientation process in step (3) is a rubbing orientation process.

An embodiment of the present invention provides a liquid crystal display device having an array substrate or a color substrate on which the alignment film is formed.

DETAILED DESCRIPTION

The polyimide films of the embodiments of the present invention are formed by polyimide, which is produced by polymerizing 1,4,5,8-naphthalenetetracarboxylic dianhydride represented by Formula-1 with bridging diphenyl diamine represented by Formula-2,

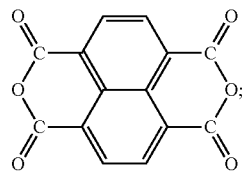

(Formula-1)

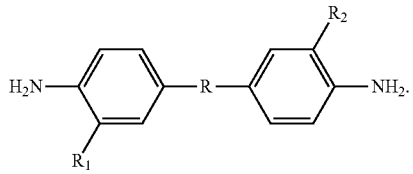

(Formula-2)

In the bridging diphenyl diamine represented by Formula-2, R can be a strong electron withdrawing group, such as S, O, $SO_2$, $CCl_2$, or $CF_2$; $R_1$ can be methyl, ethyl, propyl, isopropyl, methoxy, ethoxy, propoxy, or isopropoxy; $R_2$ can be methyl, ethyl, propyl, isopropyl, methoxy, ethoxy, propoxy, or isopropoxy.

The method for preparing the alignment films of the embodiments of the present invention comprises:

Step 1: adding a bridging diphenyl diamine to N-methylpyrrolidinone (NMP), followed by the addition of 1,4,5,8-naphthalenetetracarboxylic dianhydride to allow the reaction to occur, and then filtering the reaction mixture to give a liquid polyamide acid;

Step 2: dissolving the liquid polyamide acid into N-methylpyrrolidinone to give a solution, which is coated onto the surface of a substrate and subjected to a heat treatment, to produce a polyimide film. Thereafter, the polyimide film is subjected to an orientation process, to produce an oriented polyimide film, i.e., an alignment film. Here, the orientation process can be those commonly used in the art, such as, a rubbing orientation process, in which the polyimide film will be oriented along the rubbing direction in a rubbing roller rotating at a high-speed.

Here, the molar ratio of the bridging diphenyl diamine to 1,4,5,8-naphthalenetetracarboxylic dianhydride can be 1:1, but in practice, one of them can be in excess. For example, the molar ratio of the bridging diphenyl diamine to 1,4,5,8-naphthalenetetracarboxylic dianhydride can be in the range of from 1:1 to 1:1.1, or from 1:1 to 1.1:1.

According to the present disclosure, it can be seen that in the structure of polyimide of the embodiment of the present invention, the bridging bond R in diamine is a strong electron withdrawing group, which can reduce the bond length of C—H on the aromatic ring of diamine, and thus the harmonic vibration absorbance of C—H, finally resulting in the reduction of the light absorptivity of the polyimide film, and the enhancement of the optical transmittance of the polyimide film.

The following examples are provided to illustrate the preparation of the polyimide alignment film. These examples are only illustrative, and should not be interpreted as limiting the scope of the present disclosure.

EXAMPLE

The alignment films of the examples of the present invention can be prepared by the method for preparing the alignment film descried above. Specifically, the steps are shown below.

Step S1: At room temperature, to 200 ml dry N-methylpyrrolidinone (NMP) was added 0.05 mol bridging diphenyl diamine. 0.05 mol 1,4,5,8-naphthalenetetracarboxylic dianhydride was slowly added to the mixture with thoroughly stirring. After stirring 24 hours, the mixture was left stand and then filtered, to give a liquid polyamide acid. The liquid polyamide acid has a number-average molecular weight of 4000-6000, and its structural formula and IR spectral data are shown below,

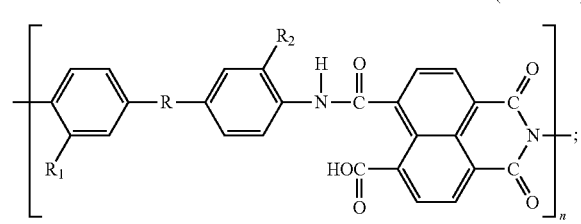

(Formula-3)

IR (KBr): 1660 cm$^{-1}$, 1720 cm$^{-1}$, 3260-3270 cm$^{-1}$.

For example, bridging diphenyl diamine may be 3,3'-dimethyl-4,4'-diamino diphenyl sulphoxide, wherein in Formula-2, R is $SO_2$, $R_1$ and $R_2$ are methyl. It should be understood that bridging diphenyl diamine in which R, $R_1$, and $R_2$ are other groups listed herein also can be used to prepare the polyimide film of the present invention according to said step.

Step S2: The liquid polyamide acid from Step 1 was dissolved in N-methylpyrrolidinone to produce a clear solution. The resulting clear solution was evenly coated onto the surface of a transparent glass substrate, with a thickness of about 100 nm. The coated substrate was heated for 5 min at 100° C. to remove a portion of residual solvent (N-methylpyrrolidinone), and then heated for 1 hr at 250° C. to produce a polyimide film upon complete curing. The polyimide has a number-average molecular weight of 4000-6000, and its structural formula and IR spectral data are shown below,

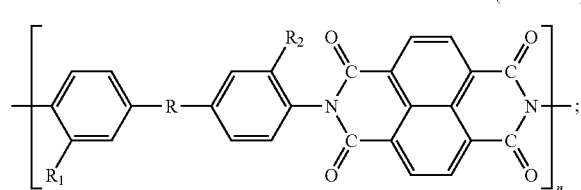

(Formula-4)

IR (KBr): 1360-1370 cm$^{-1}$.

Here, the temperature for first heating can be 90-110° C., and the heating time be 3-6 min, such that a portion of solvent (N-methylpyrrolidinone) can be removed to produce a surface-even polyimide (PI) film. The temperature for the subsequent heating can be 220-250° C., and the heating time be 40-80 min, as long as said heating can completely remove solvent and result in the formation of the polyimide film. Then, the polyimide film is subjected to an orientation process commonly used in the art, to give an oriented polyimide film.

Examples 1-15 are prepared by the preparation method described above. These Examples and comparative example are then tested for optical transmittance at various wavelengths by using EZ-COM optical measurement system, and the results are shown in Table 1.

Comparative Example has a structure represented by Formula-A described in Background section, wherein Ar is naphthyl.

TABLE 1

Optical Transmittance of the Inventive Example 1-15 and Comparative Example

| Polyimide film | R | $R_1$ | $R_2$ | 350-400 nm | 400-550 nm | 550-700 nm |
|---|---|---|---|---|---|---|
| Ex. 1 | O | methyl | methyl | 81.2 | 80.3 | 81.9 |
| Ex. 2 | O | ethyl | ethyl | 80.8 | 84.3 | 80.7 |
| Ex. 3 | O | methyl | ethyl | 85.3 | 82.2 | 86.4 |
| Ex. 4 | $SO_2$ | methyl | methyl | 81.5 | 85.4 | 83.8 |
| Ex. 5 | S | methyl | methyl | 83.3 | 85.2 | 85.1 |
| Ex. 6 | $CF_2$ | methyl | methyl | 82.4 | 81.2 | 81.1 |
| Ex. 7 | $CCl_2$ | propyl | isopropyl | 83.2 | 82.5 | 81.3 |
| Ex. 8 | $CCl_2$ | methyl | ethyl | 82.4 | 83.5 | 83.7 |
| Ex. 9 | $CCl_2$ | methoxy | ethoxy | 83.5 | 83.8 | 84.2 |
| Ex. 10 | O | ethyl | ethoxy | 81.5 | 81.6 | 81.7 |
| Ex. 11 | O | propyl | isopropyl | 80.5 | 80.8 | 82.8 |
| Ex. 12 | S | isopropoxy | propoxy | 83.6 | 83.8 | 84.2 |
| Ex. 13 | O | isopropyl | methoxy | 81.8 | 81.7 | 82.5 |
| Ex. 14 | O | ethoxy | propyl | 81.7 | 81.9 | 81.3 |
| Ex. 15 | O | propoxy | isopropoxy | 82.0 | 81.1 | 82.1 |
| Comp Ex. | $CH_2$ | H | H | 72.8 | 74.9 | 74.2 |

From the measurement results shown in Table 1, it can be seen that the polyimide films of the inventive examples have an optical transmittance of about 7%-16% higher than the comparative example.

The reason that the polyimide films of the inventive examples have exterior optical transmittance resides in: the light absorptivity of the polyimide film mainly depends on the C—H bond density in structure of polyimide film and the bridging bond R in diamine; when R is a strong electron withdrawing group, it will reduce the bond length of C—H on the aromatic ring of diamine, and thus the harmonic vibration absorbance of C—H, finally resulting in the reduction of the light absorptivity of the film, and the enhancement of the optical transmittance of the film.

An example of the present invention also provides a liquid crystal display device having an array substrate or a color substrate on which the alignment film described above (i.e., a polyimide film upon orientation) is formed.

Polyimide is prepared by the method described above.

The examples described above are only preferred examples of the present invention, and not intended to limit the scope of the present invention.

The invention claimed is:

1. An alignment film, which is formed by polyimide, wherein the polyimide has a structure represented by Formula-4:

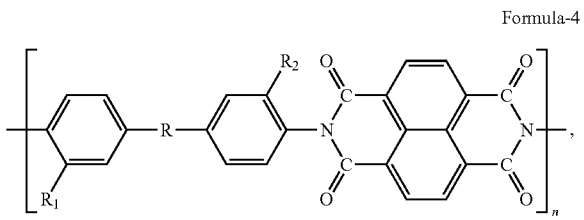

wherein, R is S, O, $SO_2$, $CCl_2$, or $CF_2$, each of $R_1$ and $R_2$ is independently methyl, ethyl, propyl, isopropyl, methoxy, ethoxy, propoxy, or isopropoxy.

2. The alignment film of claim 1, wherein said polyimide is produced by reacting 1,4,5,8-naphthalenetetracarboxylic dianhydride represented by Formula-1 with bridging diphenyl diamine represented by Formula-2,

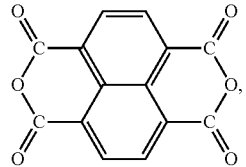

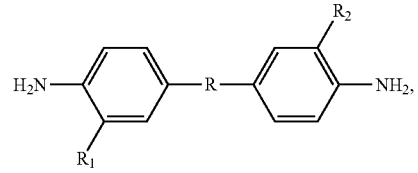

wherein in Formula-2, R is S, O, $SO_2$, $CCl_2$, or $CF_2$, each of $R_1$ and $R_2$ is independently methyl, ethyl, propyl, isopropyl, methoxy, ethoxy, propoxy, or isopropoxy.

3. A method for preparing an alignment film comprises:
(1) adding a bridging diphenyl diamine represented by Formula-2 to N-methylpyrrolidinone, followed by the addition of 1,4,5,8-naphthalenetetracarboxylic dianhydride represented by Formula-1 to allow the reaction to occur, and filtering the reaction mixture to give a liquid polyamide acid,

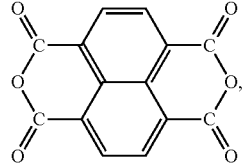

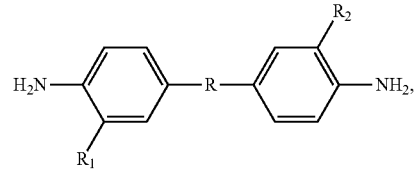

in Formula-2, R is S, O, $SO_2$, $CCl_2$, or $CF_2$, each of $R_1$ and $R_2$ is independently methyl, ethyl, propyl, isopropyl, methoxy, ethoxy, propoxy, or isopropoxy;
(2) dissolving the liquid polyamide acid into N-methylpyrrolidinone to give a solution, which is coated onto the surface of a substrate and subjected to a heat treatment, to produce a polyimide film; and
(3) orienting the polyimide film via an orientation process to form an alignment film, wherein, polyimide has a structure represented by Formula-4:

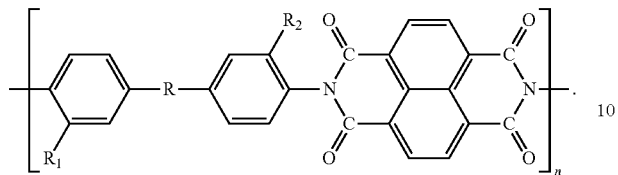

Formula-4

4. The method for preparing an alignment film of claim 3, wherein step (1) occurs at room temperature.

5. The method for preparing an alignment film of claim 3, wherein the heat treatment in step (2) includes: heating for 3-6 minutes at 90-100° C., and then heating for 40-80 minutes at 220-250° C.

6. The method for preparing an alignment film of claim 3, wherein the orientation process in step (3) is a rubbing orientation process.

7. A liquid crystal display device, having an array substrate or a color substrate on which the alignment film of claim 1 is formed.

* * * * *